(12) United States Patent
Joyner et al.

(10) Patent No.: US 7,311,844 B1
(45) Date of Patent: Dec. 25, 2007

(54) METHOD OF TREATING STORMWATER RUNOFF AND DOMESTIC WASTE WITH COAL ASH

(76) Inventors: Bobby L. Joyner, 5737 Baker La., Rocky Mount, NC (US) 27803; Robert J. Waldrop, 5189 Millwood Dr., Canton, GA (US) 30114

( * ) Notice: Subject to any disclaimer, the term of this patent is extended or adjusted under 35 U.S.C. 154(b) by 36 days.

(21) Appl. No.: 11/425,855

(22) Filed: Jun. 22, 2006

(51) Int. Cl.
*E03F 5/06* (2006.01)
(52) U.S. Cl. .................. 210/679; 210/691; 210/164
(58) Field of Classification Search ............... 210/679, 210/691, 164
See application file for complete search history.

(56) References Cited

U.S. PATENT DOCUMENTS

| 4,280,913 | A | 7/1981 | Applegate et al. |
| 6,755,905 | B2 | 6/2004 | Oates et al. |
| 7,025,887 | B1 * | 4/2006 | Kirts et al. ................. 210/681 |
| 7,186,333 | B2 * | 3/2007 | Kluge ........................ 210/164 |

* cited by examiner

*Primary Examiner*—Chester T. Barry
(74) *Attorney, Agent, or Firm*—Coats & Bennett, P.L.L.C.

(57) ABSTRACT

A method of treating wastewater, and more particularly stormwater runoff or domestic waste, wherein the wastewater is directed through a high carbon ash particulate. Contaminants such as phosphorus, nitrogen, BOD and COD can be removed. In addition, treatment of the stormwater runoff or domestic waste with ash will raise the pH of the wastewater, generally to above 10, killing bacteria contained in the wastewater.

18 Claims, 3 Drawing Sheets

METHOD OF TREATING STORMWATER RUNOFF AND DOMESTIC WASTE WITH COAL ASH

FIELD OF THE INVENTION

The present invention relates to wastewater treatment, and more particularly to treating stormwater runoff and domestic waste with a high carbon particulate composition such as coal ash.

BACKGROUND OF THE INVENTION

Government discharge regulations have long recognized the dangers of discharging wastewater with significant concentrations of phosphorus and nitrogen. Most states have stringent requirements mandating that phosphorus and nitrogen concentrations in effluents discharged from wastewater treatment plants be extremely low. These regulations, of course, apply to municipal, county and regional wastewater treatment plants. However, the dangers associated with nitrogen and phosphorus concentrations in wastewater are not confined to conventional wastewater treatment processes conducted by wastewater treatment plants. Stormwater runoff contains a significant amount of phosphorus, nitrogen, and other pollutants. Many states and government entities are beginning to direct attention to reducing the phosphorus and nitrogen concentrations in stormwater runoff.

In some locations, local governments have issued guidelines requiring that phosphorus and nitrogen be removed from certain stormwater runoff, and have required the installation of structures in an effort to reduce nitrogen and phosphorus pollutants from stormwater runoff. However, for the most part the types of structures and systems being utilized to deal with phosphorus and nitrogen in stormwater runoff have been inefficient and expensive to build and maintain. Many such systems and processes only remove approximately 25% to 50% of the nitrogen and phosphorus in the stormwater runoff.

There is a need for an efficient filtering system that is relatively inexpensive, easy to maintain, and which will remove substantial concentrations of phosphorus, nitrogen, and other pollutants from stormwater runoff and other types of wastewater, such as domestic wastewater.

SUMMARY OF THE INVENTION

The present invention relates to a system and method for removing pollutants such as phosphorus, nitrogen, BOD and COD from stormwater runoff. The method entails directing the stormwater runoff through processed ashes. In one embodiment, the ashes are coal combustion products (CCP's). In another embodiment, the ashes are the result of burning coal along with Tire Derived Fuel (TDF) and/or wood. With either case, the residual carbon content of the ashes in a preferred embodiment is approximately 10 to 20 percent which enables them to remove pollutants from stormwater runoff.

Further, the present invention relates to a method of treating domestic waste by utilizing ash to treat the wastewater prior to the wastewater being discharged into a drain field. In one embodiment, domestic waste is directed from a residential structure to a septic tank. From the septic tank the wastewater is directed through an aerobic and anaerobic bacteria filter media, and the effluent therefrom is directed to a polishing chamber that includes ash. The wastewater is directed through the ash and thereafter is discharged in a drain field.

Other objects and advantages of the present invention will become apparent and obvious from a study of the following description and the accompanying drawings which are merely illustrative of such invention.

DESCRIPTION OF EXEMPLARY EMBODIMENTS

The present invention relates to utilizing ash to treat wastewater. In particular, the method and process of the present invention relates to treating stormwater runoff or domestic wastewater. In either case an ash filtering material is utilized to remove such pollutants as nitrogen, phosphorus, BOD and COD from the wastewater being treated.

Figure 1:
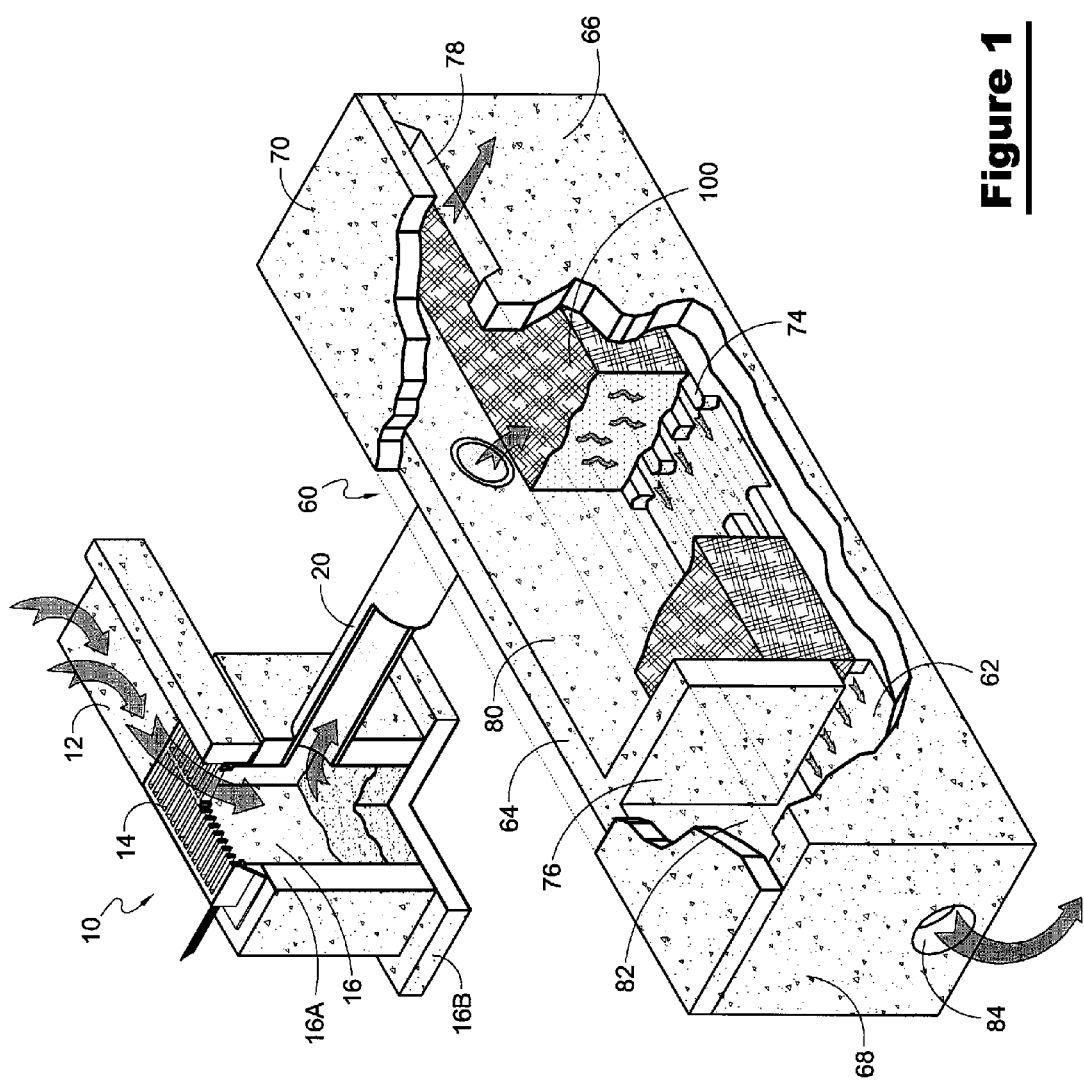
FIG. 1 is a schematic illustration showing the stormwater runoff treatment process of the present invention.
Figure 2:
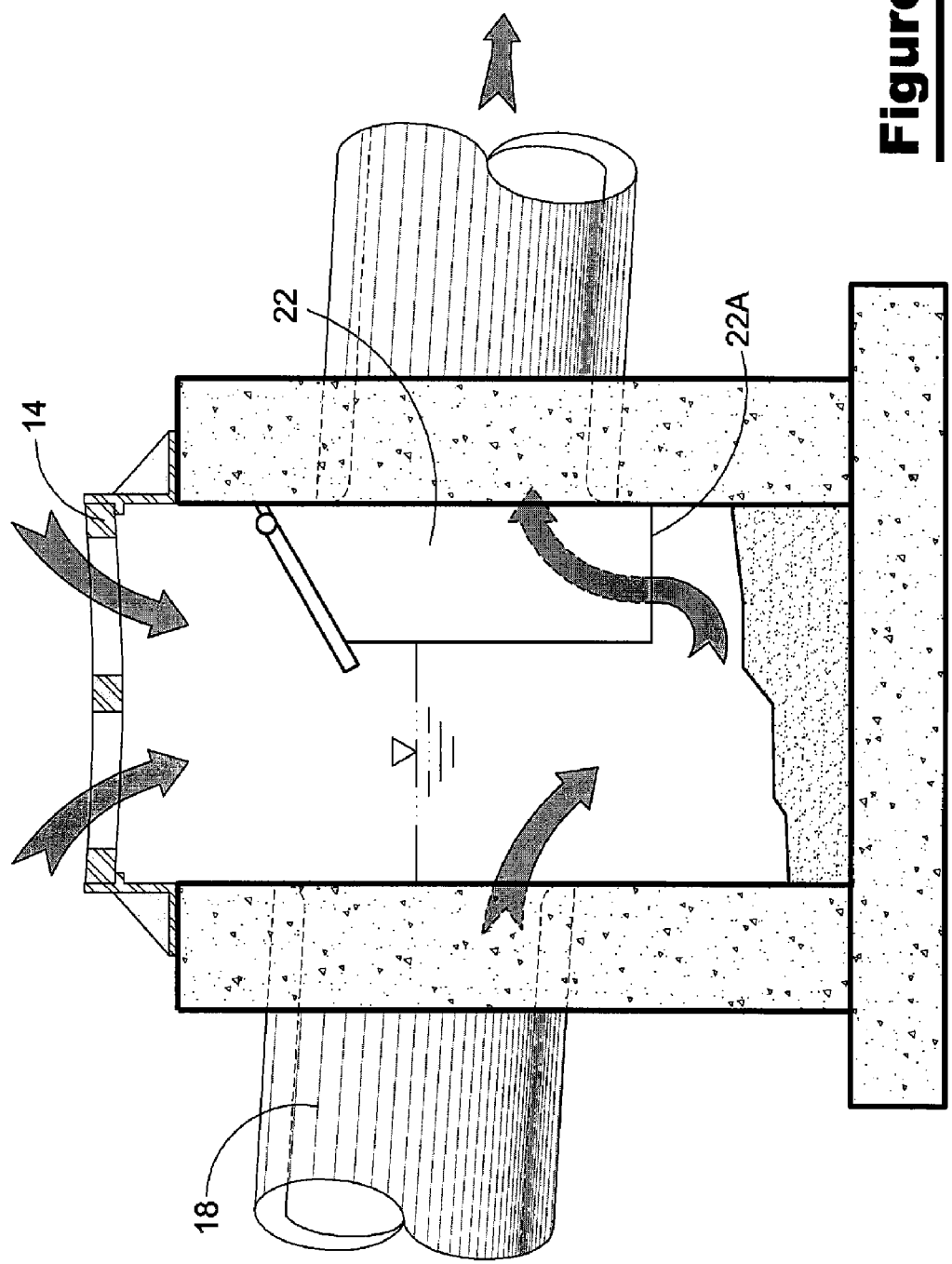
FIG. 2 is a fragmentary cross-sectional view illustrating a sand removal device that forms a part of the system and process shown in FIG. 1.

Turning to FIGS. 1 and 2, shown therein is a system and process for treating stormwater runoff. Stormwater runoff is first directed to a sand removing device indicated generally by the numeral 10. As illustrated in FIG. 1, sand removing device 10 includes an inlet 12 for receiving the stormwater runoff. Disposed adjacent inlet 12 is a grate 14 that overlies a sand chamber 16. Sand chamber 16 includes a bottom 16B and a surrounding wall structure 16A. In conventional fashion, sand removing device 10 may include an additional inlet in the form of a pipe 18 that is directed to one sidewall 16A. Extending from sidewall 16A is an outlet pipe 20. As seen in FIG. 2, the sand removal device 10 includes a baffle 22 that is disposed inside the chamber 16 and adjacent an opening that leads to the outlet pipe 20. Note that the baffle 22 includes a bottom opening 22A that is disposed below the level of the outlet pipe 20. This will prevent the wastewater received in chamber 16 from directly passing from the chamber 16 to the outlet pipe 20 without an opportunity for sand, grit and other debris to settle in the chamber. For example, as illustrated in FIG. 2, the wastewater in chamber 16 assumes a level above the bottom 22A of the baffle 22. Hence, for wastewater to exit via the pipe outlet 20, it follows that the wastewater must move downwardly and up through the opening 22A formed in the baffle. As illustrated in FIG. 2, through this process sand, grit and other debris tends to settle on the bottom of chamber 16. Hence, the sand removal device 10 tends to remove suspended solids such as sand, grit, debris and other suspended particulate material.

Downstream from the sand removing device 10 is a treatment chamber indicated generally by the numeral 60. As will be appreciated from subsequent portions of this disclosure, the treatment chamber includes an ash filtering material 100. Viewing the treatment chamber in more detail, the same includes a bottom 62 and a pair of sides 64 and 66. Disposed on opposed ends of the treatment chamber 60 is a pair of ends 68. A top 70 extends over the treatment chamber 60. Disposed over the bottom 62 is a series of spaced apart members 74. Spaced apart members 74 define a series of open channels between the respective members 74. Disposed intermediately between ends 68 is an upstanding baffle 76. Baffle 76 divides the treatment chamber 60 into an ash chamber 80 and an outlet section 82. Formed in the outlet section 82 is an outlet 84 that permits filtered water to move from the treatment chamber 60.

Formed in one side 66 is an overflow opening 78. Disposed within the ash chamber 80 is the ash filtering material 100. The ash 100 preferably contains coal ash and could contain other carbon sources. For example, the ash 100 may contain coal ash and ash from other fuels such as tire derived fuel and/or wood. The composition of ash 100 is sometimes referred to as pillow ash inasmuch as the ash material 100 is contained within a porous container, bag or even a geotextile filter media.

In the case of the embodiment illustrated in FIG. 1, stormwater runoff is directed from the sand removal device 10 through outlet pipe 20 into the ash chamber 80. There the stormwater runoff filters down through the bed of ash material 100 and into the open channels that extend along the bottom 62 between the respective members 74. The treatment chamber 60 can be slightly inclined such that the water flows towards the outlet section 82 of the treatment chamber 60. Baffle 76 is slightly elevated over the bottom 62 such that water, which has been filtered by the ash 100, passes thereunder and out outlet 84.

In many cases the stormwater runoff directed into the treatment system of FIG. 1 will include nitrogen, phosphorus, BOD, COD, oil and grease, petroleum hydrocarbons, and suspended solids. The ash will react with these pollutants or contaminants and the reaction will result in substantial portions of these pollutants being removed from the stormwater runoff being filtered through the ash 100. It is hypothesized that the carbon content of the ash will bind with these pollutants or contaminants causing them to be removed from the stormwater runoff passing through the ash 100.

Below, in Tables I and II is preliminary data relating to a series of tests where various samples of stormwater runoff was filtered by ash. Table I represents a series of tests conducted with one ash sample, denoted ash sample No. 1. In this case, raw water was first directed through the ash sample and the effluent was collected and analyzed. In the case of raw water, it is seen that, for example, the BOD (5-day) concentration of the effluent was 4.8 mg/l. Total nitrogen concentration was 1.4 mg/l and total phosphorus concentration was 0.168 mg/l. After the sample of raw wastewater was tested, a series of stormwater runoff samples was sequentially directed through the same ash sample. In particular, five different samples of stormwater runoff were directed, one after the other, through the ash sample. In each case effluent was collected and analyzed. Note that the effluent of the fourth stormwater runoff sample, for example, included a total nitrogen concentration of less than 1.08 mg/l and a total phosphorus concentration of less than 0.050 mg/l. While the concentrations of the various noted pollutants or contaminants were not measured in the sample prior to filtration through the ash sample, the test does verify that the ash is effective to reduce the concentration of these pollutants and that the ash has an ongoing capacity to treat stormwater runoff without its effectiveness being seriously depleted by initial contact with stormwater runoff.

TABLE I

Ash - Sample I

| Pollutants or Contaminants | RAW WATER | Stormwater Runoff Sample 1 | Stormwater Runoff Sample 2 | Stormwater Runoff Sample 3 | Stormwater Runoff Sample 4 | Stormwater Runoff Sample 5 |
| --- | --- | --- | --- | --- | --- | --- |
| BOD (5 Day), mg/l | 4.80 | <2.14 | <2.14 | <2.00 | <2.00 | <2.00 |
| Chemical Oxygen Demand, mg/l | 65.50 | 15.5 | 35.5 | 30.5 | 13 | 18 |
| Nitrogen: Kjeldahl (as N), mg/l | 1.21 | <1.00 | <1.00 | 4.04 | <1.00 | <1.00 |
| Nitrogen: Nitrate (as N), mg/l | 0.129 | 0.164 | 0.142 | 0.196 | 0.063 | 0.064 |
| Nitrogen: Nitrite (as N), mg/l | 0.056 | <0.025 | <0.025 | 0.044 | <0.010 | <0.010 |
| Nitrogen: Total (as N), mg/l | 1.40 | <1.08 | <1.08 | 4.28 | <1.08 | <1.05 |
| Oil and Grease, mg/l | <5.0 | <5.0 | <5.0 | <5.0 | <5.0 | <5.0 |
| Total Petroleum Hydrocarbon, mg/l | <5.0 | <5.0 | <5.0 | <5.0 | <5.0 | <5.0 |
| Phosphorus: Ortho (as P), mg/l | 0.281 | 0.298 | 0.279 | 0.100 | <0.050 | 0.109 |
| Total Phosphorus (as P), mg/l | 0.168 | <0.050 | <0.050 | <0.050 | <0.050 | <0.050 |
| Solids: Total Suspended | 7 | <1 | <1 | <1 | <1 | <1 |
| Solids: Settleable | <0.1 | <0.1 | <0.1 | <0.1 | <0.1 | <0.1 |
| Sulfate | 1.25 | 14.4 | 3.60 | 2.54 | 1.68 | 1.54 |

TABLE II

Ash - Sample II

| Pollutants or Contaminants | RAW WATER | Stormwater Runoff Sample 2 | Stormwater Runoff Sample 3 | Stormwater Runoff Sample 4 | Stormwater Runoff Sample 5 | Stormwater Runoff Sample 6 |
| --- | --- | --- | --- | --- | --- | --- |
| BOD (5 Day), mg/l | 25.1 | <2.00 | <2.00 | <2.00 | <2.00 | <2.00 |
| Chemical Oxygen Demand, mg/l | 30.5 | 26.8 | 20.5 | 43.0 | 90.5 | 38.0 |
| Nitrogen: Kjeldahl (as N), mg/l | <1.00 | <1.00 | <1.00 | 1.70 | 2.62 | 2.48 |
| Nitrogen: Nitrate (as N), mg/l | 0.128 | 0.070 | 0.058 | 0.060 | 0.064 | 0.062 |
| Nitrogen: Nitrite (as N), mg/l | 0.059 | 0.019 | <0.010 | 0.018 | <0.010 | 0.182 |
| Nitrogen: Total (as N), mg/l | <1.08 | <1.05 | <1.05 | 1.78 | 2.68 | 2.72 |
| Oil and Grease, mg/l | <5.0 | <5.0 | <5.0 | <5.0 | <5.0 | <5.0 |
| Total Petroleum Hydrocarbon, mg/l | <5.0 | <5.0 | <5.0 | <5.0 | <5.0 | <5.0 |
| Phosphorus: Ortho (as P), mg/l | 0.274 | <0.050 | 0.109 | 0.114 | <0.050 | <0.050 |

TABLE II-continued

Ash - Sample II

| Pollutants or Contaminants | RAW WATER | Stormwater Runoff Sample 2 | Stormwater Runoff Sample 3 | Stormwater Runoff Sample 4 | Stormwater Runoff Sample 5 | Stormwater Runoff Sample 6 |
|---|---|---|---|---|---|---|
| Total Phosphorus (as P), mg/l | <0.050 | <0.050 | <0.050 | <0.050 | <0.050 | <0.050 |
| Solids: Total Suspended | 4 | <1 | <1 | <1 | <1 | <1 |
| Solids: Settleable | <0.1 | <0.1 | <0.1 | <0.1 | <0.1 | <0.1 |
| Sulfate | 1.62 | 16.3 | 6.20 | 4.74 | 3.57 | 3.53 |

Figure 3:
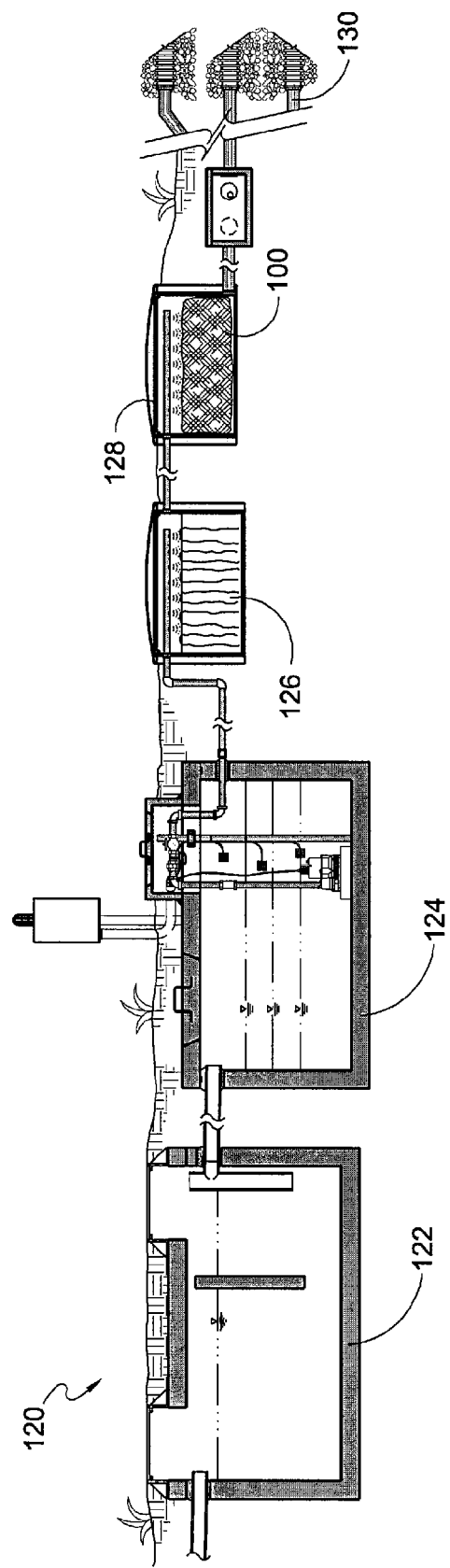
FIG. 3 is a schematic illustration of a domestic wastewater treatment process according to the present invention.

Turning to FIG. 3, the schematic shown therein illustrates a domestic wastewater treatment system such as the type that would be found associated with a residential dwelling that does not have access to county or municipal sewer. The domestic wastewater treatment system is indicated generally by the numeral 120. It includes a conventional septic tank 122. Downstream from the septic tank 122 is a pump or holding tank 124 that holds wastewater effluent from the septic tank 122. From the pump tank 124 the wastewater effluent is directed to chamber 126. Chamber 126 in this embodiment constitutes a conventional aerobic and anaerobic bacteria filter media. From chamber 126 the wastewater is directed to a polishing stage. In the polishing stage there is provided a chamber 128 that includes a filtering material that includes ash 100. Wastewater from chamber 126 is directed into a top portion of chamber 128 and thereafter the wastewater filters downwardly through the ash 100 and is treated in the process. For large systems, multiple ash chambers could be utilized. Effluent from chamber 128 is directed to a distribution box 129 and therefrom to a conventional drain field 130.

As discussed above with respect to stormwater runoff, the ash 100 in chamber 128 is effective to remove pollutants such as phosphorus, nitrogen, BOD and COD from the wastewater being treated by the domestic wastewater system 120.

Preferably, the filtering composition disclosed with respect to the processes herein would be comprised substantially of ash. Other filtering materials, or other materials that are effective to remove pollutants can be mixed with the ash. But in a preferred embodiment, the filtering material 100 would be comprised substantially of ash.

In a preferred embodiment, the ash contains coal ash. Coal ash refers to the residue produced in power plant boilers or coal burning furnaces, for example, chain grate boilers, pulverized coal boilers and fluidized bed boilers, from burning pulverized anthracite or lignite, or bituminous or sub-bituminous coal. Generally, coal ash with a relatively high carbon content is preferred. The carbon content should be 10% or more and preferably above 20%. Furthermore, the coal from which the coal ash is produced is preferred to be low sulfur coal which generally, for purposes of this disclosure, is considered to be coal having a sulfur content of 3% (by weight) or less. In some cases the filtering material utilized in the present invention is produced from co-firing alternative fuels such as tire derivative fuel and/or wood with coal. Typically, such alternative fuels would comprise less than 20% of the total volume of fuel burned to produce the filtering material.

The term "ash" is used herein to describe a filtering material used to treat wastewater. The term "ash" as used herein means coal ash or wood ash and ashes from the combustion of other fuels. For example, as discussed above, coal could be mixed with a tire derivative fuel or wood, and all the components burned in a furnace. The ash from the coal, tire derivative fuel and/or wood, could be utilized together as the filtering material. In this case, it is contemplated that the ash from the tire derivative fuel and/or wood would comprise no more than about 20% of the total ash material used for the filtering material.

The ash is typically processed or treated prior to use. First, the ash is screened to a specific size range to maximize or take advantage of the carbon content of the ash. Generally, a preferred size range includes particles of a size of ⅜" or less and sufficiently large to be screened by a No. 50 screen. Furthermore, the ash should be processed to remove excess sulfates and metals. This can be achieved by washing the ash prior to use. In the case of utilizing the ash to remove pollutants from stormwater runoff, the ash will be treated such that any subsequent leachate from stormwater runoff or other sources will meet regulatory surface water standards.

The ash utilized in the systems and processes discussed above would be manufactured or packaged either loosely or in bags of a particular shape and size, and in some cases would be wrapped in a non-woven geotextile filter media to contain the granular material. The bags of ash could be placed inside various types of structural containers or elements such as a Delaware sand filter, or other structures such as fiberglass chambers or reactors. The bags of ash would permit easy removal and replacement from a structure by maintenance personnel.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of treating stormwater runoff comprising directing the stormwater runoff through ash and utilizing the ash to remove one or more pollutants from the stormwater runoff.

2. The method of claim 1 including pretreating the ash to remove sulfates and metals.

3. The method of claim 2 including placing the ash in a chamber and directing the runoff into the chamber and through the ash.

4. The method of claim 1 including utilizing ash from a furnace which burns coal with or without other fuels.

5. The method of claim 4 including burning coal with or without other fuels in a furnace to produce the ash.

6. The method of claim 1 wherein the ash comprises ash particles and wherein the ash particles are generally smaller than ⅜" and large enough not to pass through a no. 50 sieve.

7. The method of claim 1 including containing the ash in a porous container and directing the stormwater runoff through the container and the ash therein.

8. The method of claim 1 including containing the ash in a geotexile filter medium.

9. The method of claim 1 including screening the ash to produce particles of ash of a particular size.

10. The method of claim 1 further including directing the stormwater runoff through a sand removing device that removes sand from the stormwater runoff.

11. The method of claim 1 wherein the ash removes nitrogen, phosphorus, BOD or COD from the stormwater runoff.

12. The method of claim 1 including pretreating the ash by washing the ash and removing at least some sulfates and metals from the ash.

13. The method of claim 1 including raising the pH of the stormwater runoff to 10 or higher by contacting the stormwater runoff with the ash.

14. The method of claim 13 wherein the stormwater runoff is at least slightly acidic.

15. The method of claim 1 including producing the ash from coal having a sulfur content of 3% or less.

16. The method of claim 1 wherein a tire derivative fuel and/or wood comprises approximately 10% to 20% of a fuel burned to produce the ash.

17. The method of claim 16 wherein the tire derivative fuel is produced by removing metal from tires and cutting the tires into pieces.

18. The method of claim 1 including directing the stormwater runoff through a sand removal device, and thereafter into a chamber having the ash disposed therein.

* * * * *